United States Patent [19]
Matsuda

[11] Patent Number: 5,587,724
[45] Date of Patent: Dec. 24, 1996

[54] PORTABLE TERMINAL DEVICE

[75] Inventor: Eichika Matsuda, Yamatotakada, Japan

[73] Assignee: Sharp Kabushiki Kaisha, Osaka, Japan

[21] Appl. No.: 892,316

[22] Filed: Jun. 2, 1992

[30] Foreign Application Priority Data

Jun. 6, 1991 [JP] Japan ................................. 3-135134

[51] Int. Cl.$^6$ .................................................. G06F 15/00
[52] U.S. Cl. .................... 345/156; 364/705.06; 395/155; 395/159; 395/348; 345/901
[58] Field of Search .................... 340/712, 706; 364/705.02, 705.06, 705.01, 705.05; 368/709.06, 41; 345/173, 174, 175, 157, 156, 145, 146, 117, 119, 901; 395/149, 155, 157, 159

[56] References Cited

U.S. PATENT DOCUMENTS

| | | | |
|---|---|---|---|
| 4,162,610 | 7/1979 | Levine | 368/41 |
| 4,431,870 | 2/1984 | May et al. | 340/712 |
| 4,715,010 | 12/1987 | Inoue et al. | 364/705.02 |
| 4,724,527 | 2/1988 | Nishimura et al. | 364/705.02 |
| 4,737,911 | 4/1988 | Freeman, Jr. | 364/705.02 |
| 4,885,580 | 12/1989 | Noto et al. | 364/709.01 |
| 5,093,813 | 3/1992 | Levine | 368/41 |
| 5,150,293 | 9/1992 | Murata et al. | 364/705.06 |
| 5,255,187 | 10/1993 | Sorensen | 345/117 |

FOREIGN PATENT DOCUMENTS 2-31280  2/1990  Japan .
2-250155 10/1990 Japan .

OTHER PUBLICATIONS

Using 123 Special Edition by QUE dated 1987.
ACM Press "A Color Expert System for User Interface Design" by Barbara J. Meier, 1988.

Primary Examiner—Raymond J. Bayerl
Assistant Examiner—Matthew Luu
Attorney, Agent, or Firm—Nixon & Vanderhye P.C.

[57] ABSTRACT

A portable terminal device in which information items for each kind of memorandum data are previously registered in a RAM. An operator can select a desired kind of memorandum information from among a plurality of kinds of memorandum information by depressing a memorandum key. A guidance as to a first information item of the selected kind of memorandum information is displayed on a display portion. The operator can input data of the first information item with keys by following the guidance on the display portion. When the input operation for the data of the first information item is finished, a line-feed is automatically inserted by depressing a specified key, and a next guidance as to a second information item is displayed on the display portion. The operator inputs data of the second information item with the keys by following the displayed guidance. In a similar manner, the operator sequentially inputs data of all the information items by following the corresponding guidance on the display portion. When the input operation for the data of all the information items is completed, the whole data is stored into the RAM. The stored data is read out and displayed on the display portion at any desired time.

5 Claims, 10 Drawing Sheets

PORTABLE TERMINAL DEVICE

BACKGROUND OF THE INVENTION

1. Field of the Invention

The present invention relates to a portable terminal device such as an electronic organizer. In more detail, the present invention relates to a portable terminal device in which information items can previously be set in accordance with a kind of memorandum information to be input in the succeeding input operation, and by which an operator can input data for the memorandum information by following the displayed guidance corresponding to each preset information item, so to speak, in an interactive manner.

2. Description of the Prior Art

In an example of electronic organizers, when data for memorandum information is to be input, such guidance as "MEMO ?" for demanding the input of data for memorandum information is displayed on a liquid crystal display (LCD) portion, thereby facilitating the operation by an operator.

Figure 9:
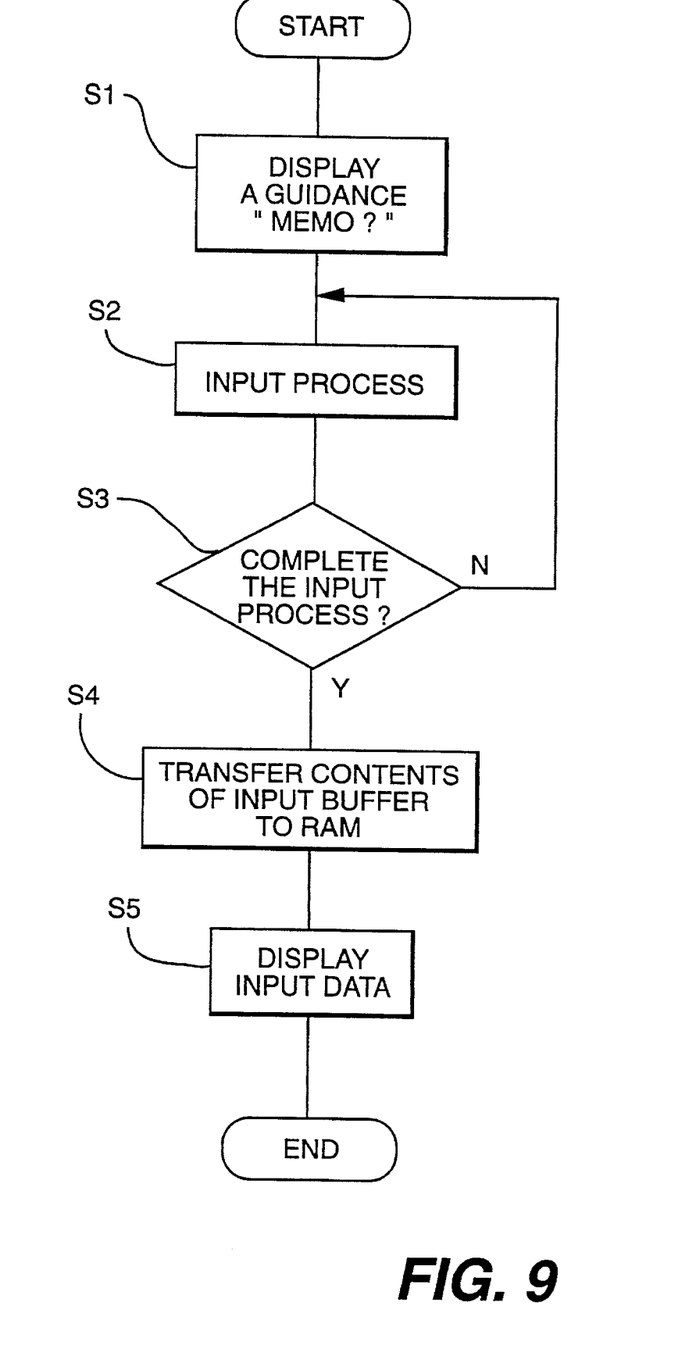
FIG. 9 is a flowchart illustrating a control procedure by a CPU in a prior art electronic organizer when memorandum information is to be input.

FIG. 9 illustrates a control flow of a CPU in such an electronic organizer when data for memorandum information is to be input. When power is turned on, the CPU first demands a key input from the operator by displaying the guidance "MEMO ?" on the LCD portion at step S1. Next, in step S2, a subroutine is executed for an input process in which memorandum data input by the operator with keys are sequentially stored in an input buffer. In step S3, it is judged whether or not the input process is completed. If Yes, the data stored in the input buffer are transferred to and written into a RAM (step S4). In step S5, the data in the RAM are read out and displayed on the LCD portion.

Figure 10:
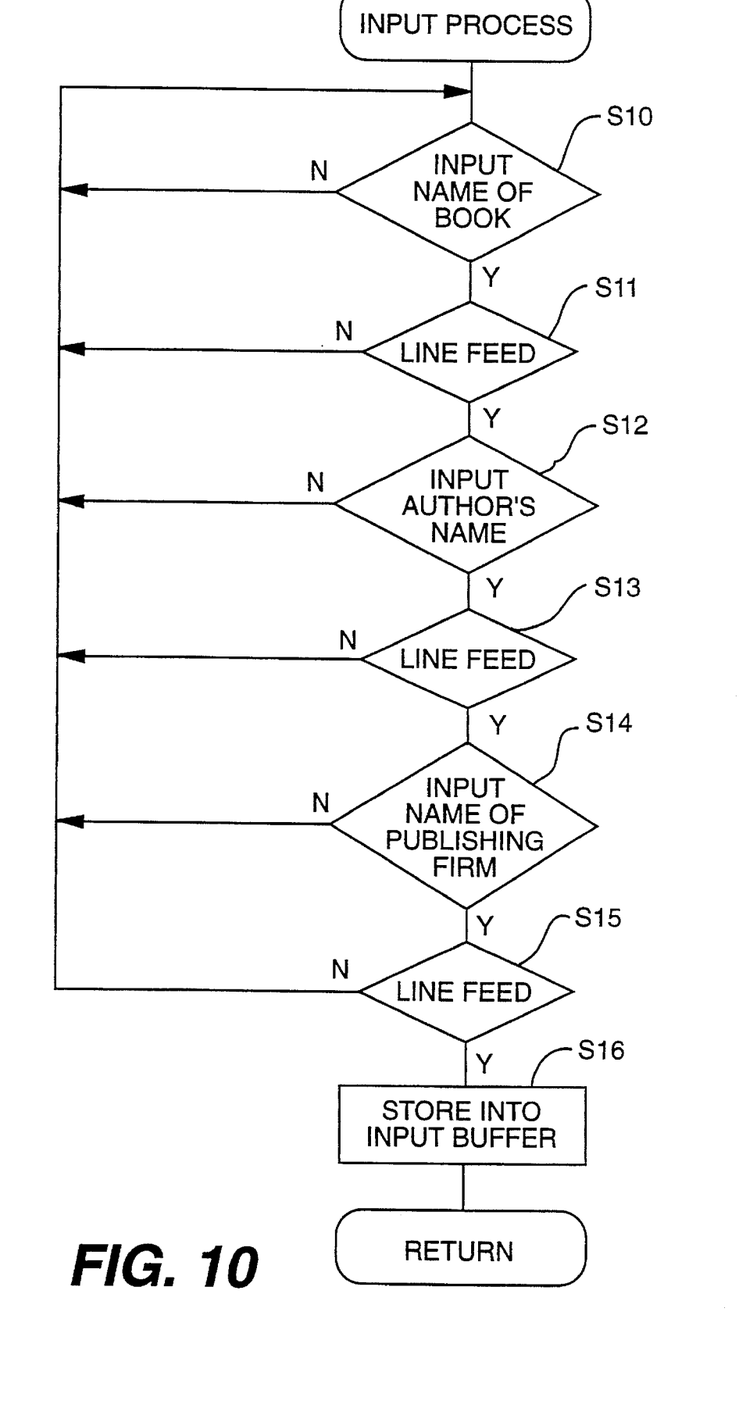
FIG. 10 is a flowchart illustrating a subroutine in the input process of FIG. 9.

FIG. 10 illustrates the subroutine for the input process at step S2 in a case where information of a book is to be input. Under the control of the CPU, it is judged that a name of the book is input by the operator with the keys at step S10. It is judged whether a line-feed key is depressed or not at step S11. If Yes, it is judged whether an author's name is input or not at step S12. If Yes, it is judged whether or not the line-feed key is depressed again at step S13. If Yes, it is judged whether or not a name of a publishing firm is input at step S14. If Yes, it is judged whether or not the line-feed key is depressed over again at step S15. If Yes, the information of the book comprising the above-mentioned input data is stored into the input buffer (S16). Then, the process returns to the flowchart of FIG. 9.

As described above, in the prior art, since the operator is required to inform the CPU that the input data is determined by depressing the line-feed key, the operational procedure is very troublesome. Furthermore, since the operator must remember which operation is now being performed, the operator disadvantageously tends to become fatigued.

In addition, when it is desired to input data using the same format as the data which has already been stored in the RAM, the operator must check the data which has already been input, and know the operational procedure for inputting the data and depressing the line-feed key. This causes the operational procedure to be complicated, whereby the operator is likely to become fatigued.

SUMMARY OF THE INVENTION

The portable terminal device of this invention, comprises: input means for receiving data of information items from an operator; display means for displaying guidances corresponding to said information items; memory means for registering a plurality of information items relating to a kind of memorandum information; and control means for controlling alternately to display a guidance corresponding to an information item of said kind of memorandum information on said display means, and to receive data of said information item from an operator through said input means, based on an order with which said plurality of information items are registered in said memory means.

According to another aspect of the invention, a portable terminal device, comprises: input means for receiving data of information items from an operator; display means for displaying guidances corresponding to said information items; memory means for registering a plurality of information items relating to each of a plurality of kinds of memorandum information; selecting means for selecting a kind of memorandum information from said plurality of kinds of memorandum information registered in said memory means; and control means for controlling alternately to display a guidance corresponding to an information item of said selected kind of memorandum information on said display means, and to receive data of said information item from an operator through said input means, based on an order with which said plurality of information items are registered in said memory means.

According to another aspect of the invention, a method of inputting data of information items in a portable terminal device, comprises the steps of: registering a plurality of information items relating to a kind of memorandum information; controlling alternately to display a guidance corresponding to an information item of said kind of memorandum information, and to receive data of said information item from an operator, based on an order with which said plurality of information items are registered.

With the above configuration, when the operator selects a memorandum key from among function select keys, an application program for inputting memorandum information stored in a ROM is started. By the selecting means, a desired kind of memorandum information is selected from among a plurality of kinds of memorandum information. Each kind of memorandum information may include a plurality of information items which are previously registered in the memory means. A guidance as to a first information item of the selected kind of memorandum information is displayed on the display means. Therefore, the operator can input data of the first information item with keys by following the guidance on the display means. When the input operation for the data of the first information item is finished, a line-feed is automatically inserted by depressing a specified key, and a next guidance as to a second information item is displayed on the display means. The operator inputs data of the second information item with the keys by following the displayed guidance, in a similar manner. As described above, the operator sequentially inputs data of all the information items by following the corresponding guidance on the display means. When the input operation for the data of all the information items is completed, the whole data is stored into the memory means. The stored data is read out and displayed on the display means at any desired time.

According to the system configuration described above, the operator can input memorandum information in an interactive manner with the portable terminal device. Therefore, the memorandum information can rapidly be input in a simple manner.

Thus, the invention described herein makes possible the objectives of (1) providing a portable terminal device which can solve the above-mentioned disadvantages of the prior art, (2) providing a portable terminal device in which the operational procedure is simple, so that an operator can perform an input operation without being fatigued, and (3) providing a portable terminal device the operability of which can be significantly enhanced.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
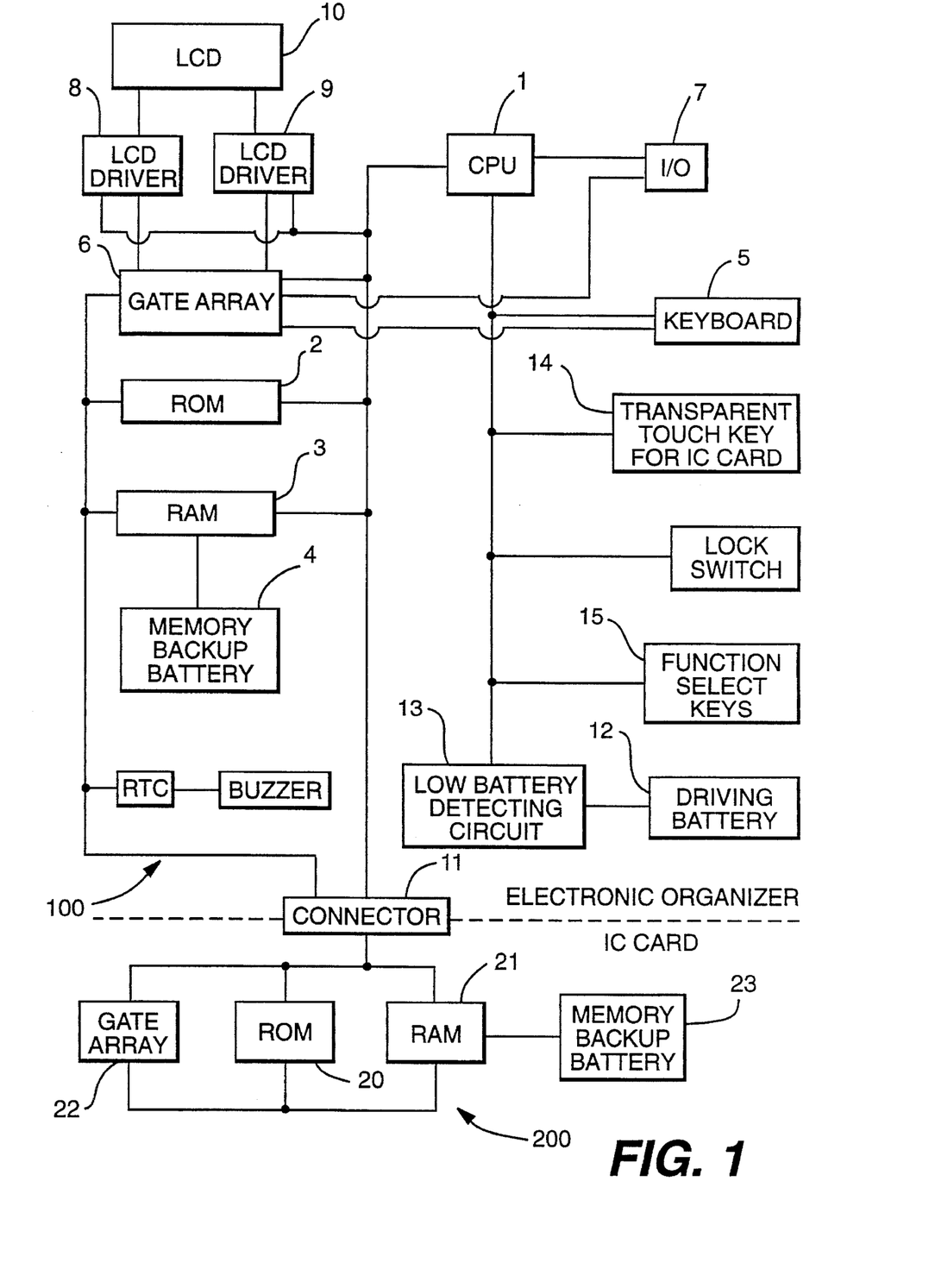
FIG. 1 is a block diagram showing the hardware configuration of an electronic organizer of the present invention and an IC card incorporated therein.

FIG. 1 shows an electronic organizer 100 of the present invention and an IC card 200 incorporated therein. A CPU 1 serves as the control center of the electronic organizer 100, and controls various processes in accordance with a plurality of application programs stored in a ROM 2. As an example of the controls, data is written into a RAM 3 in the following manner.

When an operator operates a keyboard (keys on the body) 5 provided on the electronic organizer 100 to input data, the input data is input into the CPU 1 through a gate array 6 and an I/O portion 7. From the CPU 1, the input data is written into the RAM 3 through the gate array 6. The data written in the RAM 3 is prevented from being lost by a memory backup battery 4.

An LCD 10 as a display portion is connected to the gate array 6 via LCD drivers 8 and 9. The LCD 10 displays data which is stored in the RAM 3 and read out by the CPU 1 and a guidance which is described below.

A slot is provided at one end face of the electronic organizer 100. Through the slot, the IC card 200 is inserted. When the IC card 200 is set in position, a connecter 11 electrically connects the IC card 200 with the electronic organizer 100. In the connected condition, a driving battery 12 of the electronic organizer 100 supplies power to the IC card 200. The driving battery 12 also supplies power to the CPU 1 in the electronic organizer 100. To the driving battery 12, a low battery detecting circuit 13 is connected for detecting the battery capacity of the driving battery 12. The CPU 1 is informed of the result detected by the low battery detecting circuit 13.

Now, the configuration of the IC card 200 is described. In a ROM 20, a plurality of application programs for driving the IC card 200 are stored. A desired application program can be selected by operating a key matrix which is printed on the surface of the IC card 200. When the IC card 200 is set in position, the key matrix can be seen through a transparent touch key for IC card (transparent touch panel switches) 14 provided at the corresponding position of the electronic organizer 100. More specifically, when depressing a portion of the transparent touch key for IC card 14 corresponding to a desired application program, the desired application program is selected and the CPU 1 is informed of the selection result.

When the IC card 200 is set in the electronic organizer 100, the CPU 1 controls a process in which data written in a RAM 21 is read out and displayed on the LCD 10 or other processes in accordance with the application programs stored in the ROM 20. The CPU 1 controls another process in which data input from the keyboard 5 is written into the RAM 21. Data is written into and read out from the RAM 21 via a gate array 22. The RAM 21 is connected with a memory backup battery 23. Accordingly, when the IC card 200 is detached from the electronic organizer 100, the memory backup battery 23 prevents the data written in the RAM 21 from being lost.

Figure 2:
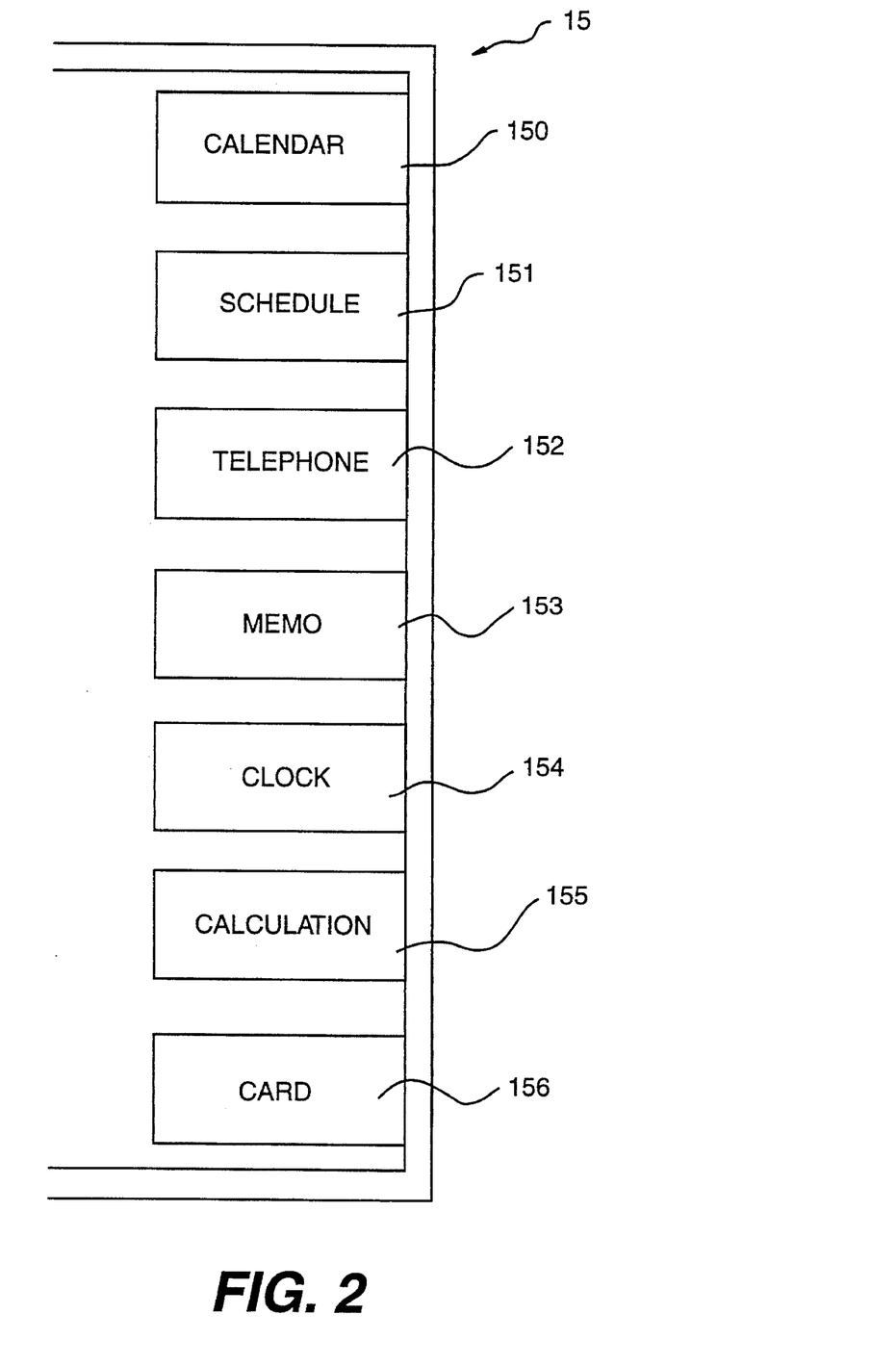
FIG. 2 shows function select keys on the electronic organizer of the invention.

In addition to the above-mentioned configuration of the electronic organizer 100 according to the invention, function select keys 15 for selecting various functions (menus) are associated. In FIG. 2, the function select keys 15 are shown in detail. The function select keys 15 include a calendar key 150, a schedule key 151, a telephone key 152, a memorandum key 153, a clock key 154, a calculation key 155, and a card key 156. When any one of the keys is selected other than the card key 156, the CPU 1 is informed of the selection result. Under the control of the CPU 1, an application program corresponding to the selected key from among the plurality of application programs stored in the ROM 2 is started. Thereafter, the electronic organizer 100 is set in the selected mode.

For example, in a case where the memorandum key 153 is selected, an application program as to a process for inputting memorandum information in which memorandum information is written into the RAM 3 is started, and thus the electronic organizer 100 is set in a memorandum information input mode. On the contrary, in a case where the card key 156 is selected, an application program stored in the ROM 20 of the IC card 200 is started.

Figure 3:
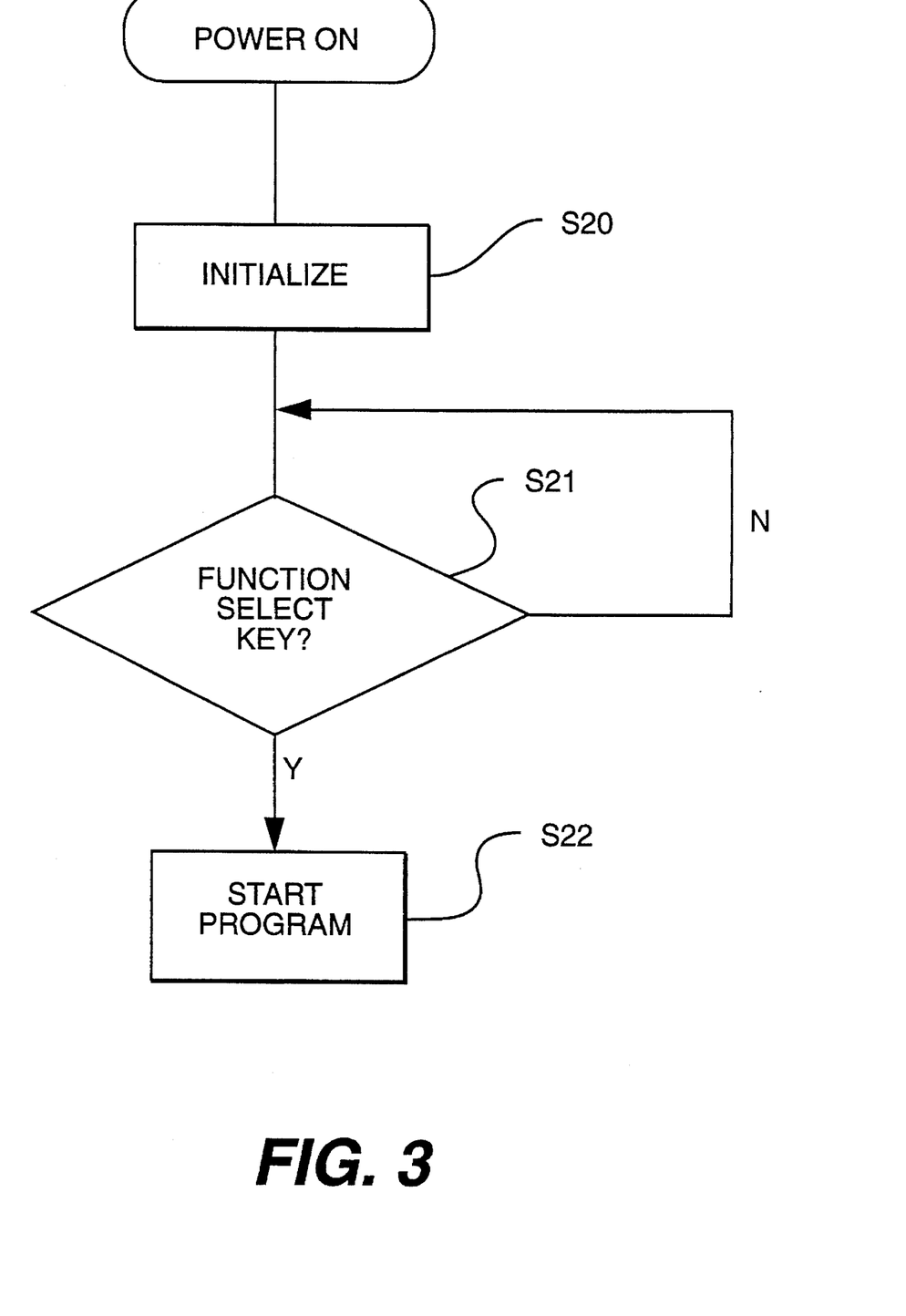
FIG. 3 is a flowchart illustrating a process for starting an application program.

FIG. 3 shows a control flow of the CPU 1 for a process starting an application program. The application programs in the ROM 2 are initialized at step S20. In step S21, it is judged whether or not any one of the function select keys 15 has been depressed. If it is verified that any one of the functions is selected by a key depression, a corresponding application program ie executed (S22).

Figure 4:
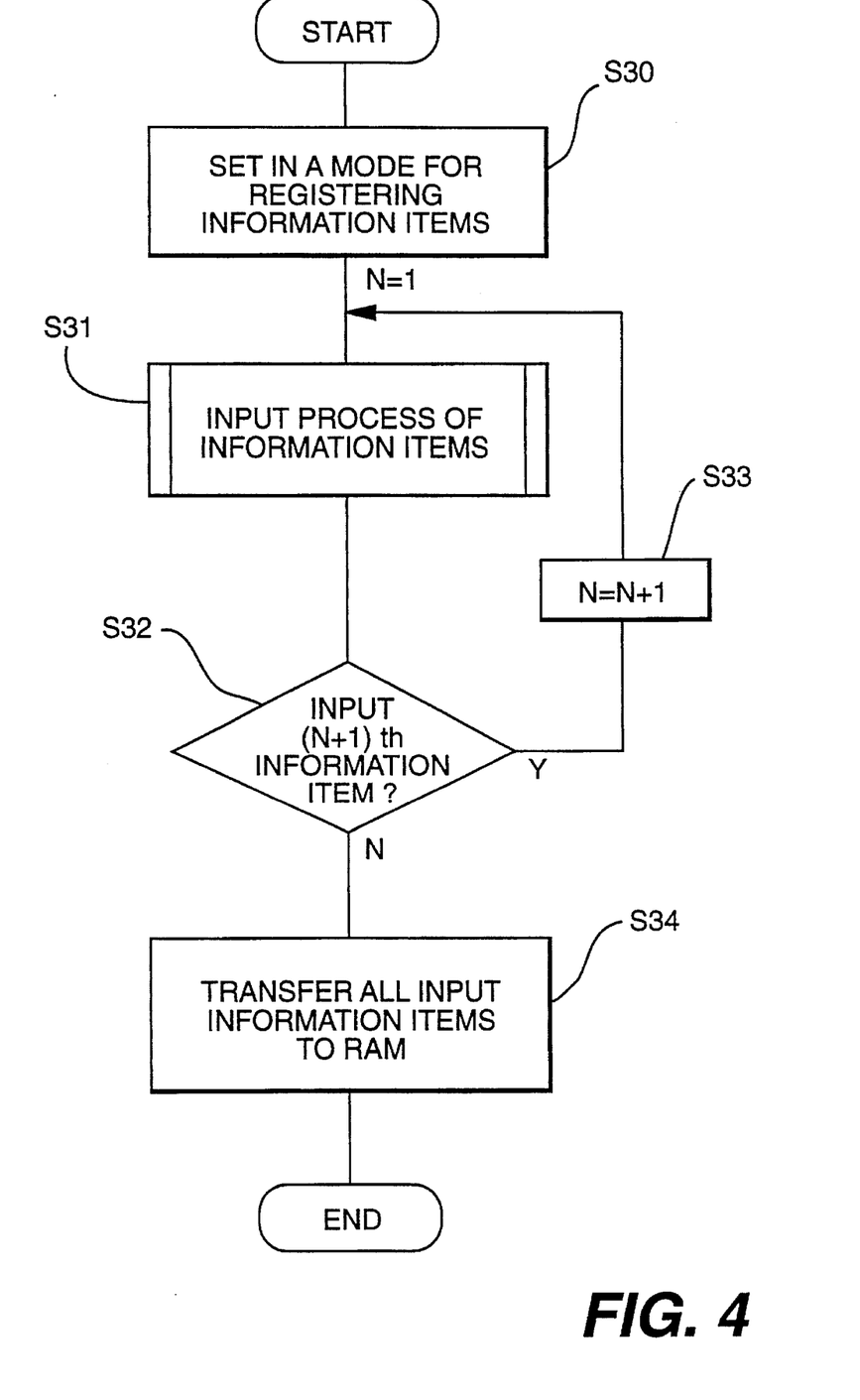
FIG. 4 is a flowchart illustrating a process for registering information items.

FIG. 4 shows a control flow of the CPU 1 for a process registering information items. When the electronic organizer 100 is set in a mode for registering information items at step S30 by the key operation of the operator, a number N is set in a condition of N=1, where the number N indicates the Nth information item. In step S31, a subroutine as to a process for inputting information items which are required to input memorandum information of a specific kind, for example, is executed, and the input process for the first information item is performed. Next, in step S32, it is judged whether a next information item is to be input or not. If Yes, the number N is set to be 2 (S33), and the input process of step S31 is repeated. Every time a new information item is input, the number N is incremented by one. When it is verified that there is no information item to be newly input, the information items which have been input are transferred to and written into the RAM 3 (S34). Thus, a plurality of information items are registered in the RAM 3.

As described above, N numbers of information items can be registered as one kind of memorandum information. In the same manner, information items of a plurality of different kinds of memorandum information can be registered. For example, as a first kind of memorandum information, three information items relating to a book, that is, a name of the book, an author's name, and a name of the publishing firm are registered. As a second kind of memorandum information, two information items relating to a price list, that is, a name of goods and the price.

In this example, a guidance corresponding to each information item is displayed on the LCD 10. More specifically, the information items registered in the RAM 3 are sequentially read out end the guidance corresponding to each information item is displayed on the LCD 10. As a result, data of information item can be input by following the displayed guidance. In other words, according to the invention, memorandum information can be input in an interactive manner with the apparatus. The manner is now described in detail.

Figure 5:
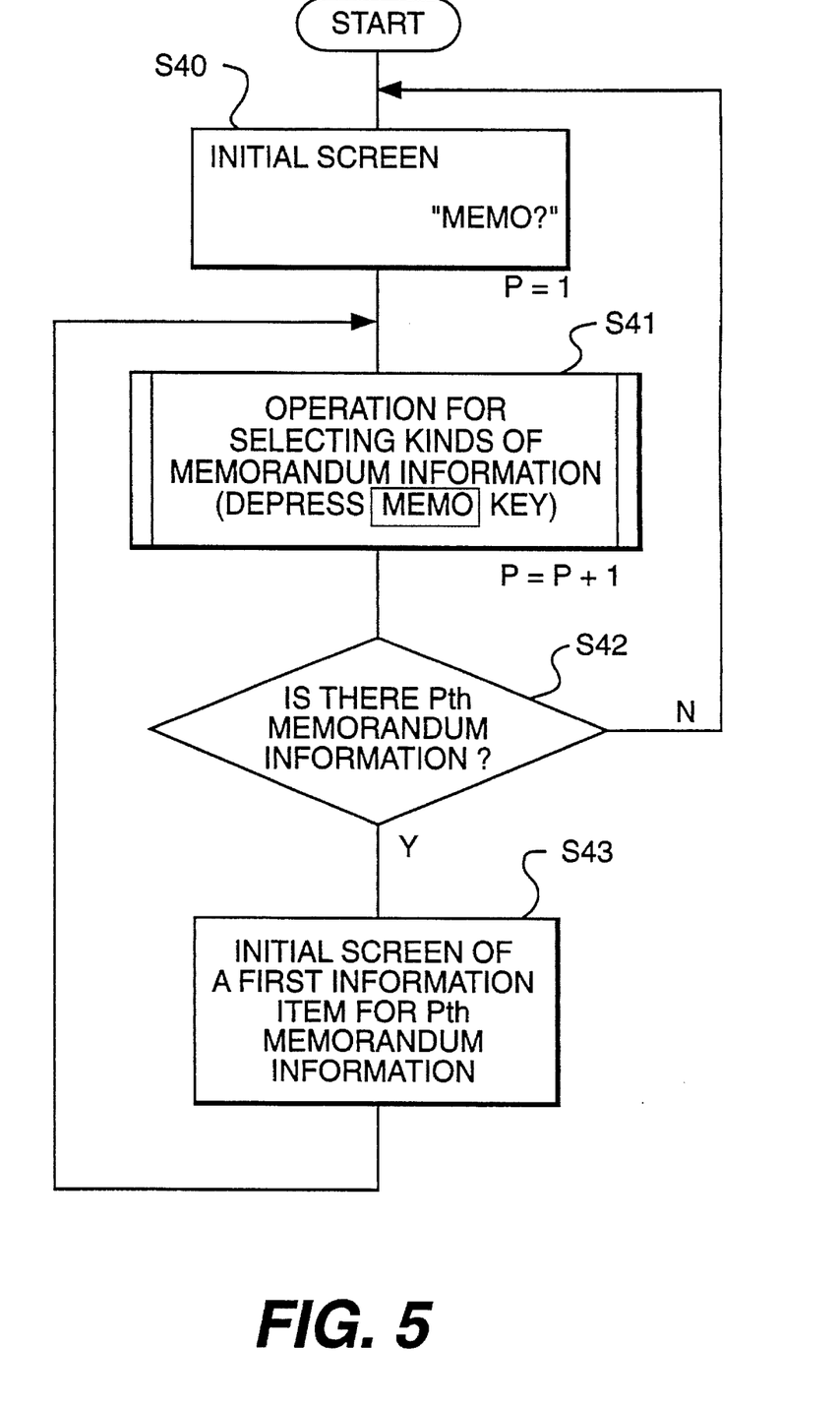
FIG. 5 is a flowchart illustrating a process for shifting a display screen from a guidance to a next one.

FIG. 5 is a flowchart illustrating a process for selecting a desired kind of memorandum information by depressing the memorandum key 153. At first, the LCD 10 displays an initial screen "MEMO ?" in a state where the kind of memorandum information has not been specified yet, in step S40, under the control of the CPU 1. A number P indicates the Pth kind of memorandum information and the number P is first set to be 1. When the memorandum key 153 of the function select keys 15 is depressed by the operator, a subroutine for the selecting process is executed at step S41. After this subroutine, the number P is incremented to be P+1.

Next, in step S42, it is judged whether or not the Pth kind of memorandum information is stored in the RAM 3. If Yes, the information items of the Pth kind of memorandum information are read out and the LCD 10 displays an initial screen, i.e., a guidance corresponding to the first information item of the Pth kind of memorandum information (S43). After completing the process of step S43, the subroutine of step S41 is repeated. Thereafter, every time the memorandum key 153 is depressed by the operator, the number P is incremented to be P+1, and the LCD 10 displays an initial screen for the (P+1)th kind of memorandum information.

Figure 6:
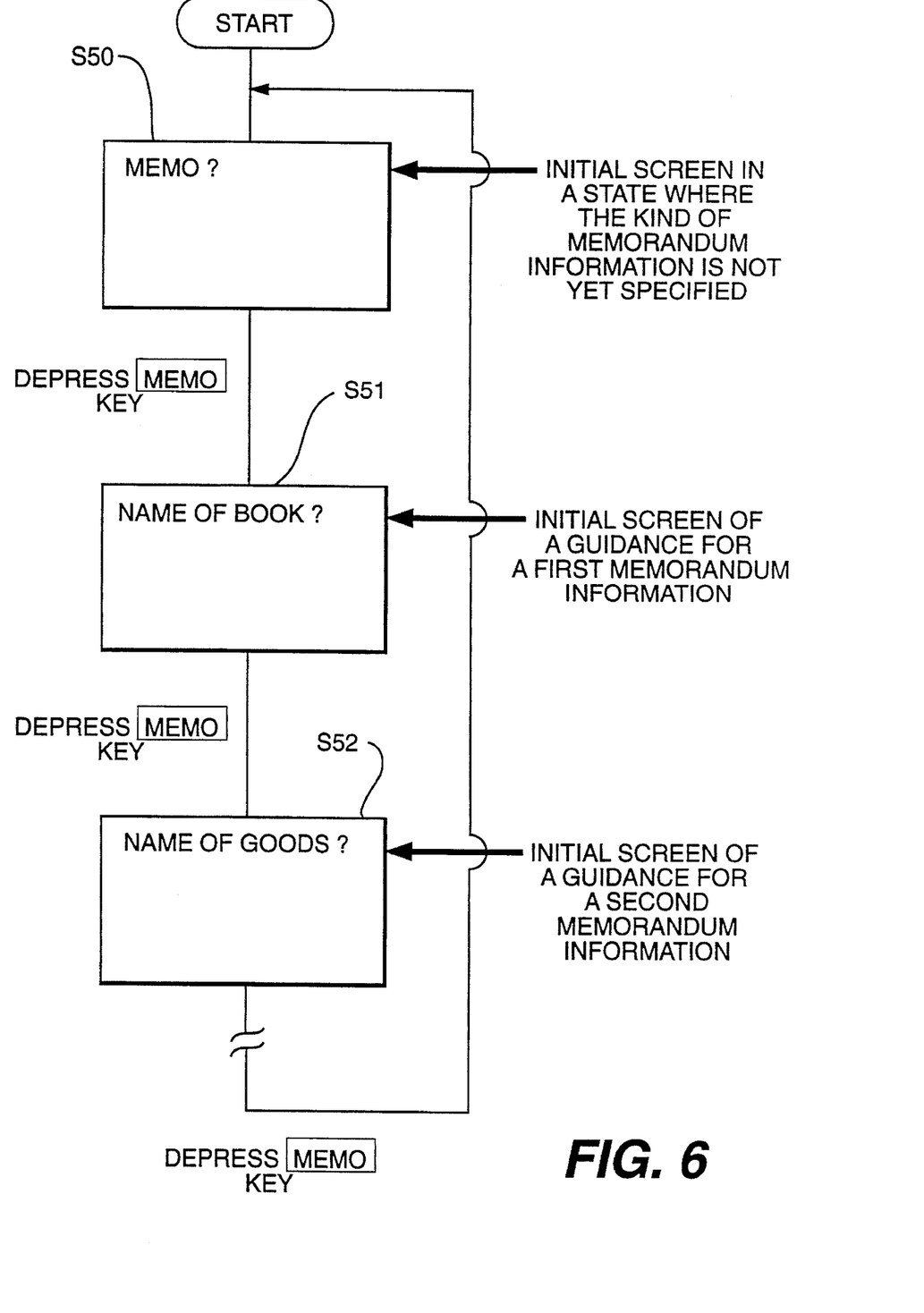
FIG. 6 is a flowchart specifically illustrating the process of FIG. 5.

FIG. 6 shows a specific example of the above-mentioned selecting process. In step S50, the LCD 10 displays the initial screen "MEMO ?" in a state where the kind of memorandum information has not been specified yet. When the memorandum key 153 is depressed by the operator, a first kind of memorandum information is selected, and an initial screen thereof is displayed on the LCD 10 (S51). For example, in a case where three information items, a name of a book, an author's name, and a name of a publishing firm have been registered as a first kind of memorandum information relating to a book, a guidance "NAME OF BOOK ?" corresponding to a first information item of a name of a book is displayed at step S51.

Next, when the memorandum key 153 is depressed for the second time, a second kind of memorandum information is selected and an initial screen thereof is displayed on the LCD 10 (S52). For example, in a case where two information items, a name of goods and a price have been registered as a second kind of memorandum information relating to a price list, a guidance "NAME OF GOODS ?" corresponding to a first information item of a name of goods is displayed at step S52. In the same manner, the next kind of memorandum information is selected and the initial screen thereof is displayed on the LCD 10, every time the memorandum key 153 is depressed.

Figure 7:
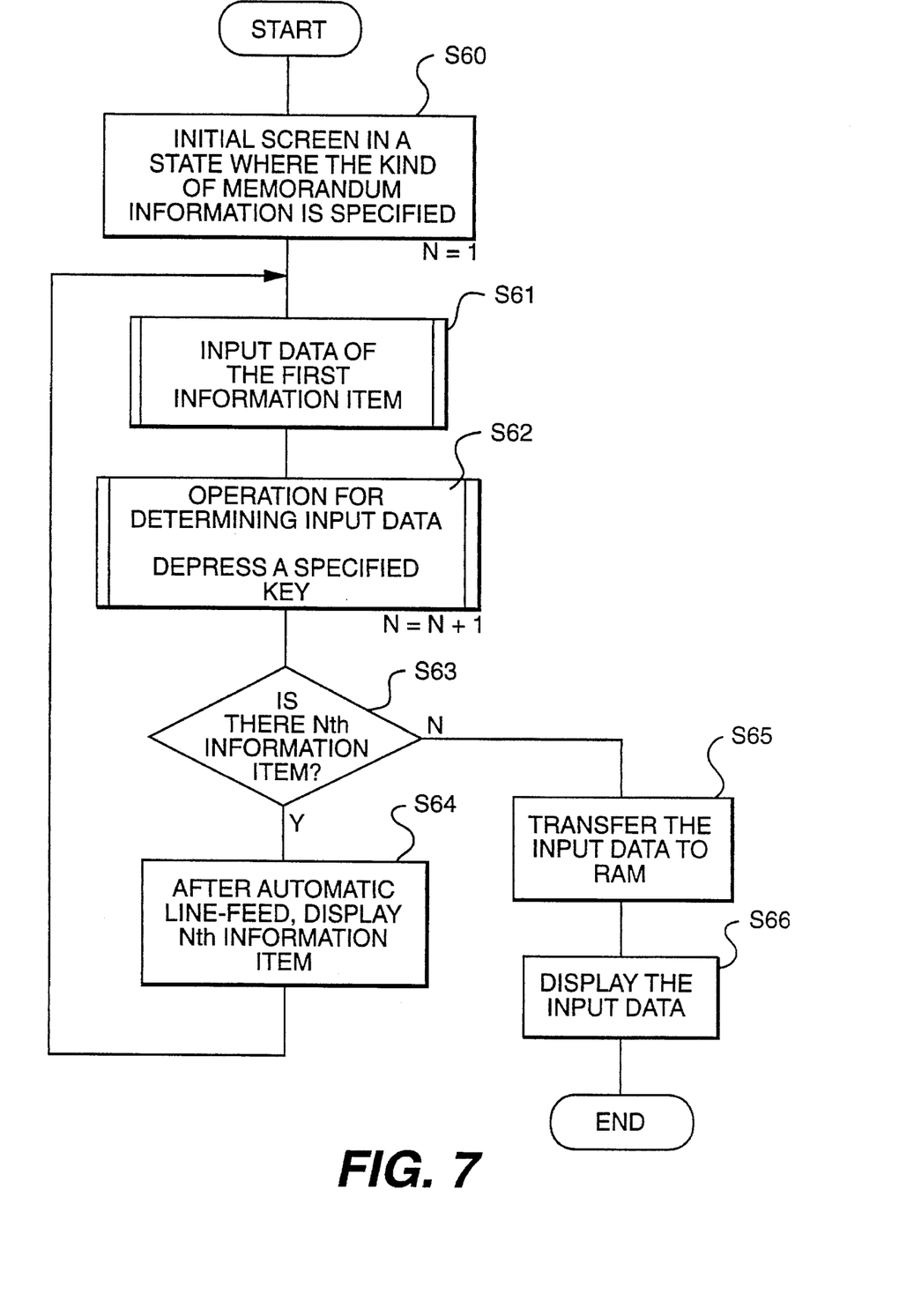
FIG. 7 is a flowchart illustrating a process for inputting data.

FIG. 7 shows a process of inputting data of information items by following the displayed guidance. Under the control of the CPU 1, the LCD 10 displays an initial screen for a specified kind of memorandum information at step S60. In this example, the number N is set to be 1. When data of the information item is input by the operator with the keyboard 5, a subroutine for the input process of taking in the data is executed (S61). When a specified key on the keyboard 5 is depressed by the operator, a subroutine for determining the input data is executed at step S62. The specified key may be a line-feed key. After the subroutine, the number N is incremented to be N+1. Then, in step S63, it is judged whether there exists an Nth information item or not. If Yes, in step S64 after an automatic line-feed function is executed, a guidance corresponding to the next information item is displayed on the LCD 10. Thereafter, the process returns to step S61, and the succeeding steps are repeated.

On the other hand, if it is judged that there is not the Nth information item at step S63, that is, if it is judged that the data input operation for all the information items is completed, the input data is transferred to the RAN 3 via the input buffer, and written into the RAM 3 (S65). Then, the data written in the RAM 3 is read out and displayed on the LCD 10 (S66).

Figure 8:
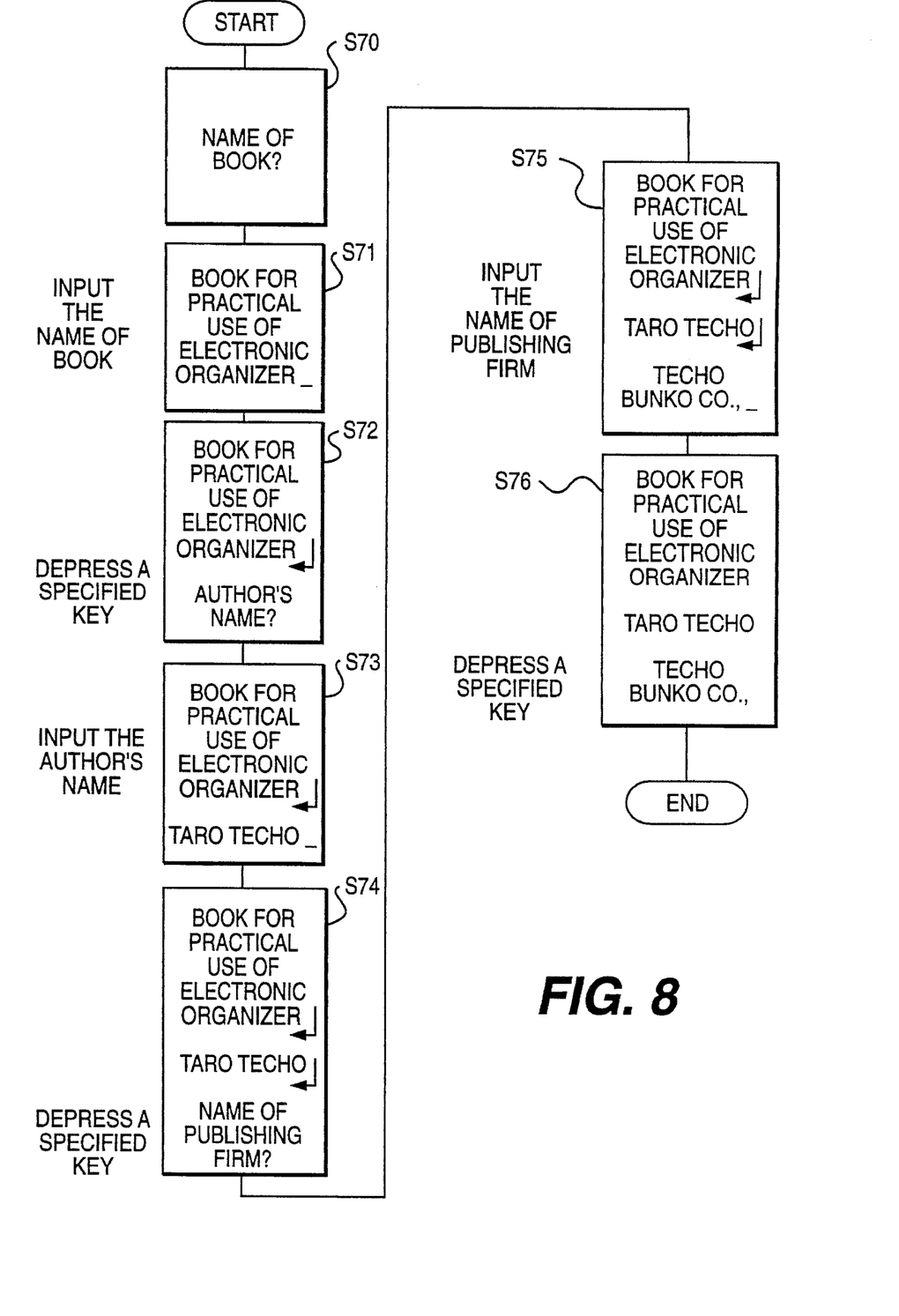
FIG. 8 is a flowchart specifically illustrating the process of FIG. 7.

FIG. 8 shows a specific example of the process shown in FIG. 7. A guidance "NAME OF BOOK ?" corresponding to the first information item is displayed on the LCD 10 at step S70. Data of the first information item "Book for practical use of electronic organizer" is input by the operator (S71). After the specified key is depressed by the operator, the next guidance "AUTHOR'S NAME ?" corresponding to the second information item is displayed on the LCD 10 (S72).

When data of second information item "TARO TECHO" is input by the operator, the data is displayed together with the previous data "Book for practical use of electronic organizer" (S73). When the specified key is depressed by the operator, the LCD 10 displays a guidance corresponding to the next information item. Actually, the guidance "NAME OF PUBLISHING FIRM ?" for demanding to input the name of the publishing firm is displayed together with the data "Book for practical use of electronic organizer" and "TARO TECHO" (S74).

After the name of the publishing firm "Techo Bunko Co.," is input at step S75, and when the specified key is depressed, the whole data of three information items are displayed on the LCD (S76). Then, the process is completed.

As described above, with the system configuration in which a guidance corresponding to each information item is displayed on the display portion, a delimiter code between the information items is generally required. However, in this embodiment, since a line-feed function is automatically performed by depressing a specified key, which serves as a delimiter code, it is unnecessary to use a special delimiter code. Therefore, the format of the data which are input with previously registered information items according to the embodiment is the same as that of the conventional data and that of the data which are input without previously registered information items. This means that the data which are input according to embodiment advantageously has the compatibility with the conventional data and the data which are input without previously registered information items.

In the above-described embodiment, the memorandum information relating to a book and a price list is used, but other kind of memorandum information can also be used. Furthermore, the invention can be applied for any type of portable terminal device other than the above-mentioned electronic organizer.

As described above, according to the invention, data of information items constituting memorandum information can be input by following the guidance corresponding to each information item displayed on the display portion. In other words, the data of information items can be input in an interactive manner with the apparatus. Therefore, the input operation can rapidly and accurately be performed in a simple manner. As a result, the operator does not become fatigued, even if the operator operates the apparatus for a long time. That is, according to the invention, the operability of a portable terminal device is significantly enhanced.

Furthermore, in a case where data of information items for the same kind of memorandum information is to be input, the same format of information items can be used. In terms of this, there is also an advantage in that the input operation can be rapidly and accurately be performed in a simple manner.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A multiple memorandum information portable terminal device, comprising:

input means for receiving information items in a registration mode and for receiving data in a subsequent input mode, respectively input by an operator;

display means for displaying operator guidance prompts corresponding to said information items in a subsequent input mode;

memory means for registering in the registration mode a plurality of said information items relating to a plurality of different types of memorandum functions including at least calendar, schedule, telephone directory, clock, and calculation functions;

selecting means for selecting a memorandum function from said plurality of different kinds of memorandum functions registered in said memory means; and control means for repeating alternately a display operation and a data receiving operation, said display operation displaying an operator guidance prompt corresponding to an information item of a selected memorandum function, said data receiving operation receiving data input by the operator through said input means in the input mode in response to the operator guidance prompt, said input data being stored in connection with said information item, based on an order in which said plurality of information items are registered by an operator in said memory means.

2. A portable terminal device according to claim 1, wherein said input means receives data of information items into which a line-feed is automatically inserted in response to a specified key being depressed by an operator.

3. A portable terminal device according to claim 2, wherein said selecting means selects said memorandum information in response to a memorandum key being depressed by an operator.

4. A method of inputting data of information items in a portable terminal device, comprising the steps of:

initially registering a plurality of information items input by an operator for each of different types of memorandum information;

displaying as operator guidance information one of said plurality of information items of any one of said different types of memorandum information;

receiving data input by the operator in response to the displayed operator guidance information, said received data being stored in connection with said at least one information item, based on an order in which said plurality of information items are initially registered by said operator; and repeating alternately said displaying step and said receiving step.

5. A multiple memorandum information portable terminal device, comprising:

input means for receiving information items in a registration mode and for receiving data in a memorandum mode, respectively input by an operator;

a display for displaying operator guidance prompts corresponding to said information items in both of said registration mode and said memorandum mode and for displaying said data in said memorandum mode;

a memory for registering said information items in said registration mode and for registering said data in said memorandum mode; and a controller for alternately repeating a display operation for displaying one of said operator guidance prompts based on an order in which said information items are input by said operator and registered in said memory and a data receiving operation for receiving data input by the operator in said memorandum mode.

* * * * *